United States Patent [19]

Lagally

[11] 3,774,983

[45] Nov. 27, 1973

[54] LOW FRICTION BEARING-JOURNAL ARRANGEMENT

[75] Inventor: Paul Lagally, Annapolis, Md.

[73] Assignee: The United States of America as represented by the Secretary of the Navy

[22] Filed: Dec. 27, 1971

[21] Appl. No.: 212,630

Related U.S. Application Data

[63] Continuation-in-part of Ser. No. 6,187, Jan. 27, 1970, abandoned.

[52] U.S. Cl............. 308/238, 308/DIG. 8, 161/42, 161/49, 161/214
[51] Int. Cl. .......................................... F16c 33/20
[58] Field of Search.............. 308/238, 237, DIG. 7, 308/DIG. 8, 237; 161/214, 162, 168, 49, 42; 260/94.9

[56] References Cited
UNITED STATES PATENTS
2,246,042   6/1941   Gilman .............................. 308/238

OTHER PUBLICATIONS

Kirk–Othmer, Encyclopedia of Chemical Technology, Second Edition, Vol. 14, pages 246–250.

*Primary Examiner*—William J. VanBalen
*Assistant Examiner*—Stanley S. Silverman
*Attorney*—R. S. Sciascia et al.

[57] ABSTRACT

A new type of bearing-journal arrangement, which can operate with water as the lubricant or in a dry environment, displaying a kinetic coefficient of friction in the wet or dry state of less than 0.2, showing no sign of vibrational motion and being capable of bearing a low load of 100–1,000 psi.

1 Claim, 1 Drawing Figure

PATENTED NOV 27 1973 3,774,983
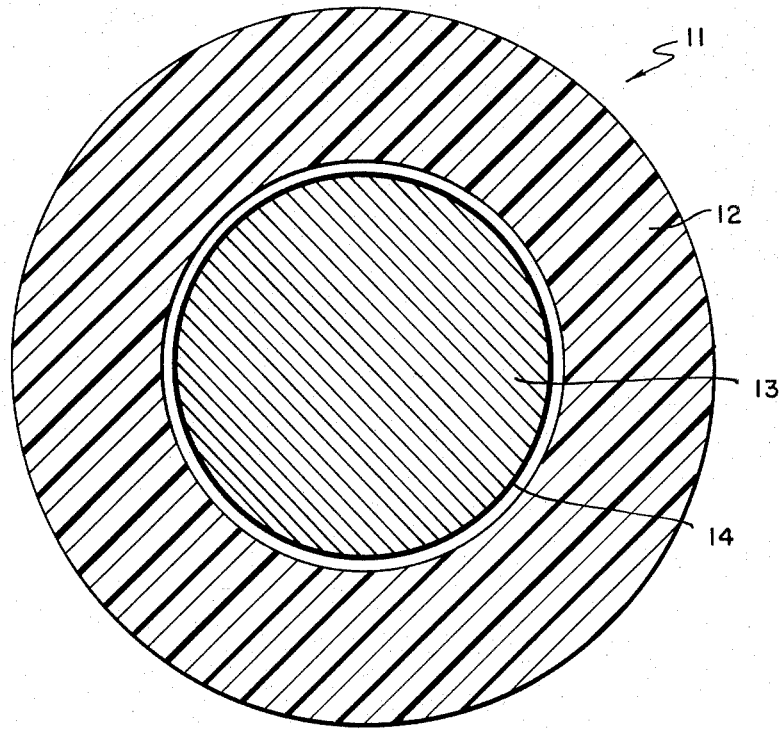
INVENTOR.
PAUL LAGALLY
BY
ATTORNEY

LOW FRICTION BEARING-JOURNAL ARRANGEMENT

CROSS REFERENCES TO RELATED APPLICATIONS

This application is a continuation-in-part to application, Ser. No. 6,187 filed 27 Jan. 1970 now abandoned.

The invention described herein may be manufactured and used by or for The Government of the United States of America for Governmental purposes without the payment of any royalties thereon or therefor.

BACKGROUND OF THE INVENTION

The search for materials to be used in sliding contact applications is rapidly moving into areas where conventional bearing-journal designs usually fail. This is particularly true for machine elements lubricated by water. New approaches are required to overcome problems ordinarily not encountered.

In the predominantly non-hydrodynamic regime where the rubbing surfaces are in frequent contact, vibration-free sliding characteristics and a sufficient load bearing capacity are requirements. To keep corrosion and wear within the bearing design at a minimum, one of the two rubbing surfaces should be non-metallic. This makes organic polymers, because of their almost unlimited chemical and structural versatility, promising candidates for the mating bearing materials.

When a plastic bearing is used, it must be dimensionally stable and free from deflections. This requires a chemically inert matrix with a modified surface capable of meeting lubrication conditions in both the wet and dry states. Polyalkenes are suitable as bearing materials because their structure can be changed without substantially affecting their overall composition.

Titanium metallic journals are presently being used in water environments because of their non-corrosive nature. But a problem exists with this type of journal in that galling or scuffing becomes of greater significance and reduces the operational life-span of the journal.

SUMMARY OF THE INVENTION

This invention relates to a novel bearing couple which can operate without the use of a lubricating oil. More particularly, it refers to a plastic bearing which is in sliding contact with a corrosion-resistant metal journal which either is lubricated by seawater or can operate in the dry state if the lubricant is lost. In addition, the new bearing must operate without signs of vibrational motions in the dry and wet state. Specifically, the requirements for the new bearing design are a frictional coefficient of less than 0.20, a high resistance to wear and a low load bearing capacity of 100–1,000 psi.

It has been discovered that high density polyethylene, having a melt index of 5.0–6.0, a molecular weight of approximately 90,000 and a density of 0.95 meets these requirements.

Prior to the discovery of stereoregular polymers, the only form of polyethylene known was a branched type with a low degree of crystallinity. Due to a lack of structural order, plastic bearings made from this material (Gilman, U.S. Pat. No. 2,246,092 of 17 June 1941) generally referred to as "low density polyethylene" have poor sliding qualities and limited load bearing capability. Although these bearings have been recommended for water-lubricated systems, they show severe vibrational motions particularly under dry sliding conditions (see Gilman, column 2, line 29). It could not be expected that a structurally different material generally referred to as "high density polyethylene" would overcome the deficiencies of the conventional material, particularly with regard to dry sliding and load bearing capability.

According to Kirk-Othmer (Encyclopedia of Chemical Technology, 2nd Edition, Vol. 14, pages 246–250) reduction in density of linear polyethylene from 0.96 to 0.95 gr/cm$^3$, having melt indices of 0.2–0.4 and a molecular weight range of 175,000 to 160,000, results in increased load bearing capability. The instant invention is not primarily concerned with load bearing capacity, but rather with improved frictional qualities, specifically a low coefficient of friction. Kirk, et al., dealt with one end of a curve, i.e., load bearing capacity increases with increasing density up to a point which is approximately 0.95. The load bearing capacity then starts to decrease. Kirk, et al., did not go further down the density scale, and therefore, never found the turning point. As molecular weight is increased, the material becomes more brittle. The material of the present invention has a molecular weight of about 90,000, much less than that of Kirk, et al. One of the major reasons for the turning point in load bearing capacity is high molecular weight. Kirk, et al., does not teach the use of high density polyethylene with the lower molecular weight of the instant invention to give improved frictional qualities.

Although bronze, titanium, and zirconium, along various other metals, have been used as journal materials when furnished with a proper protective coating (McCullough, U.S. Pat. No. 2,622,993 of 23 Dec. 1952), no process is known whereby unprotected titanium can be used as a member of a bearing couple when water is the lubricant. This is in contrast to our invention where a high density polyethylene material is used as the bearing which lubricates the mating initially unprotected titanium surface.

OBJECTS OF THE INVENTION

It is the object of the present invention to provide a new type of bearing-journal design which has improved overall sliding qualities in both wet and dry environments.

Other objects and many of the attendant advantages of the instant invention will be readily appreciated as the same becomes better understood by reference to the following detailed description when considered in connection with the accompanying drawing wherein:

BRIEF DESCRIPTION OF THE DRAWING

The sole FIGURE illustrates a cross-sectional view of a bearing-journal arrangement.

DESCRIPTION OF THE PREFERRED EMBODIMENT

In general, a surface of plastic material when rubbing against another surface of the same or similar plastic material results in a high coefficient of friction. The instant invention has its origin in the finding that certain organic materials when present as coating films on metals, or other substrates of high elastic modulus, improve the frictional qualities of the substrate, particularly when water is the lubricant. As an example, two surfaces of the various forms of polyethylene rubbing against each other have rather high coefficients of friction, which coincide in the wet and dry state, but when one of the surfaces is a form of polyethylene film coated on a high elastic modulus substrate, then a distinctly improved frictional behavior is produced. (Table I)

TABLE I

Coefficient of Friction of Conventional and High Density Polyethylene

| Bearing | Journal | Coefficient of Friction* | |
|---|---|---|---|
| | | Dry | Wet (Water)* |
| Polyethylene Low Density | Polyethylene Low Density | 0.57 | 0.51 |
| Polyethylene Low Density | Polyethylene High Density | 0.51 | 0.52 |
| Polyethylene High Density | Polyethylene High Density | 0.48 | 0.43 |
| Polyethylene High Density | Polyethylene Low Density | 0.47 | 0.47 |
| Polyethylene High Density | Bronze | 0.15 | 0.11 |
| Polyethylene High Density | Bronze | 0.63 | 0.15 |
| Polyethylene Low Density | Bronze | 0.32 | 0.21 |

*Slow Speed Sliding Range (50 RPM); Loading = 13 Lbs (78 PSI)

Referring to the sole FIGURE, a bearing-journal arrangement is illustrated which makes use of the aforementioned finding. Reference numeral 11 designates a conventional bearing-journal design comprising a hollow cylindrical bearing 12 and a solid cylindrical journal 13. The inside diameter of the bearing is slightly greater than the outside diameter of the journal so that the journal can rotate freely within the bearing. The novelty of the instant invention lies in the particular materials which comprise the bearing and journal. The bearing material is a high density polyethylene having a melt index of about 5.0 to about 6.0, a molecular weight of about 80,000 to about 90,000, and a density of about 0.95 gr/cm³ while the journal material, such as bronze or titanium, is selected from the high modulus supporting material group. In addition, reference numeral 14 designates a protective polyethylene coating formed on the outside surface of the journal.

TABLE II

Coefficient of Friction of Stereoregular Polymers in Sliding Contact with Bronze (50 RPM, 13 Lbs = 78 PSI)

| Material | Coefficient of Friction | |
|---|---|---|
| | Dry | Wet |
| Polyethylene, high density* | 0.16 | 0.09 |
| Polypropylene, isotactic** | 0.45 | 0.25 |
| 2.58% decalin soluble | | |
| 6.1% decalin soluble | 0.45 | 0.28 |
| 11.1% decalin soluble | 0.39 | 0.31 |
| Polybutene-1 (isotactic) | 0.74 | 0.40 |
| Poly-(4-methyl) pentene-1 | — | 0.25 |
| Poly-3, 3-Bis (Chloromethyl) oxetane "Penton" | 0.30 | 0.17 |

*MICROTHENE ML 708
**Experimental Samples

The various forms of polyethylene reveal their improved performance characteristic only when in sliding contact with a suitable mating surface. The corrosion-resistant metals, such as titanium and zirconium, alloys of such metals, monels and bronzes are preferred as high modulus supporting materials for the rotating journal (Table III). Ceramics, including the various forms of carbon and metal carbides, are also acceptable. Although it is known that a polymer requires a hard backing to display its minimum friction, it could not be anticipated that a highly hydrophobic substance would function as a bearing material for water lubrication. The difference between wet and dry friction (Table I), which depends also on the mating journal (Table III), suggests the presence of an adhesion mechanism in the sliding interface.

TABLE III

Coefficient of Friction of High Density Polyethylene Sliding Against Different Mating Surfaces

| Bearing | Journal | Coefficient of Friction | |
|---|---|---|---|
| | | Dry | Wet (Water) |
| Polyethylene High Density | Bronze (Composition"M") | 0.14* | 0.11* |
| | Titanium-Alloy** | 0.12 | 0.05 |
| | Titanium (pure) | 0.15 | 0.15 |
| | Zirconium (pure) | 0.23 | 0.16 |
| | Aluminum-Alloy*** | 0.17–0.25**** | 0.09 |
| | Chromium (pure) | 0.17 | 0.11 |
| | Chromium (plated) | 0.17* | 0.11* |
| | Copper (pure) | 0.18 | 0.10 |
| | Stellite 6 | 0.18 | 0.10 |

*Slow Speed Sliding Range (50 RPM; 13 Lbs = 78 PSI)
**Ti-7Al-2Cb-1Ta
*** Al 7075-T-7351
****Friction Peak Such a mechanism becomes even more obvious when the sliding characteristics of polyethylene and TEFLON are compared. Prefluorination seems to weaken those functions which facilitate lubrication with water (Table IV).

TABLE IV

Comparison of the Sliding Behavior of High Density Polyethylene and TEFLON

| Bearing | Coefficient of Friction* | |
|---|---|---|
| | Dry | Wet (Water) |
| High Density Polyethylene | 0.13 | 0.08 |
| TEFLON | 0.19 | 0.19 |

*Slow Speed Sliding Range (50 RPM; 13 Lbs = 78 PSI)

The following example is illustrative of the present inventive concept. Kinetic friction was determined on a modified Amsler machine which consists of a test journal (2 inches diameter) mounted on the end of a horizontal, ball-bearing rotating shaft and a lever device for pressing a block (one inch cube) of material against the journal. The shaft is driven by a motor which acts through a system of planetary gears and a weighted pendulum yoke, thus permitting measurement of the amount of driving torque being transmitted.

The operating procedure consisted of first starting the motor and recording the machine friction base line, then starting the lubricant flow, applying the load and finally recording the torque over a period of time. If $F_t$ is the tangential force in pounds and L is the load on the journal in pounds, the kinetic coefficient of friction is given by the expression $$f_k = (F_t/L)$$

The regime of semifluid (or mixed) lubrication, where vibrational motions occur most frequently, was established by measuring torque (or coefficients of friction) at different bearing loads and increasing sliding velocities. Results were obtained at a journal speed of 50 rpm (or a sliding velocity of 5.25 inches per second) and with a bearing load of 13 representing a pressure of approximately 100 psi.

Polyethylene and the other polymers were compresseion molded at a temperature reaching 500°F. and a pressure at 10,000 psi.

Although throughout the above discussion the bearing material has been selected from the polyalkene group and the journal from the high modulus supporting material group, the principles of the instant invention would similarly apply if the journal were a polyalkene and the bearing a high modulus supporting material.

Obviously many modifications and variations of the present invention are possible in the light of the above teachings. It is therefore to be understood that within the scope of the appended claim the invention may be practiced otherwise than as specifically described.

What is claimed is:

1. A low friction bearing-journal arrangement which consists essentially of:

a first member formed from a high density polyethylene having a melt index from about 5.0 to about 6.0, a molecular weight of about 80,000 to about 90,000, and a density of about 0.95 gr/cm$^3$; and a second member, which mates with said first member, formed from a high modulus supporting material selected from the group consisting of titanium, zirconium, alloys of such metals, monels, bronzes and ceramics.

* * * * *